April 17, 1973 A. J. STANLEY 3,728,199

TAPE APPLYING APPARATUS

Filed May 17, 1971 3 Sheets-Sheet 1

INVENTOR
ALEXANDER J. STANLEY
BY [signature]
AGENT

TAPE APPLYING APPARATUS

Filed May 17, 1971 3 Sheets-Sheet 2

INVENTOR
ALEXANDER J. STANLEY
BY [signature]
AGENT

TAPE APPLYING APPARATUS
Filed May 17, 1971
3 Sheets-Sheet 3
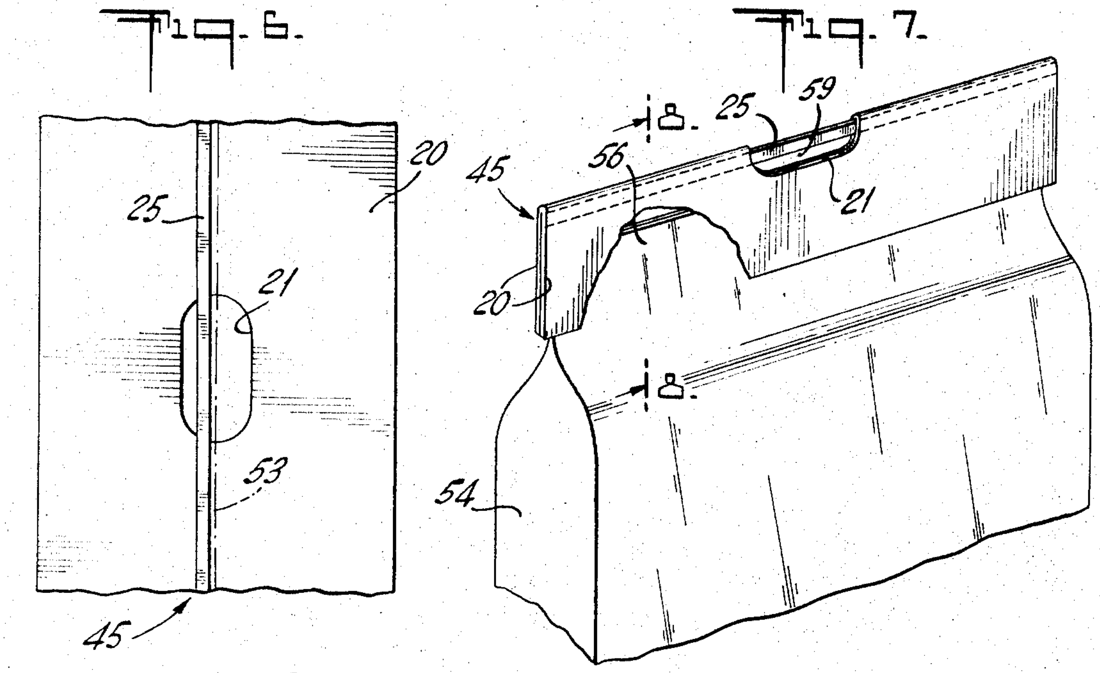
FIG. 6, FIG. 7
FIG. 8.
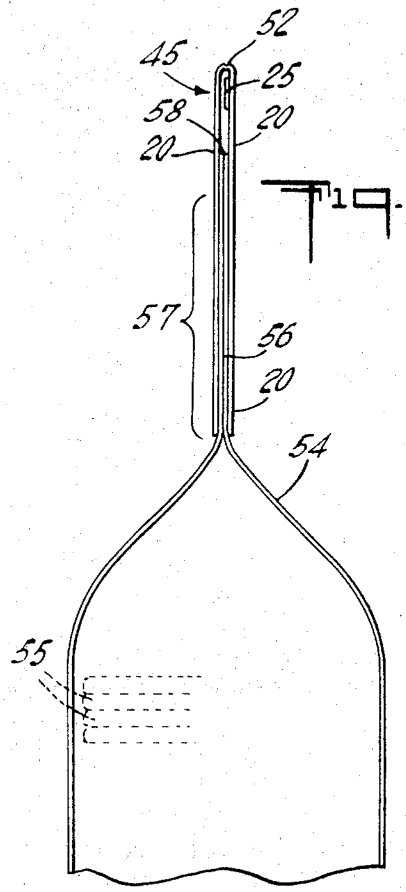
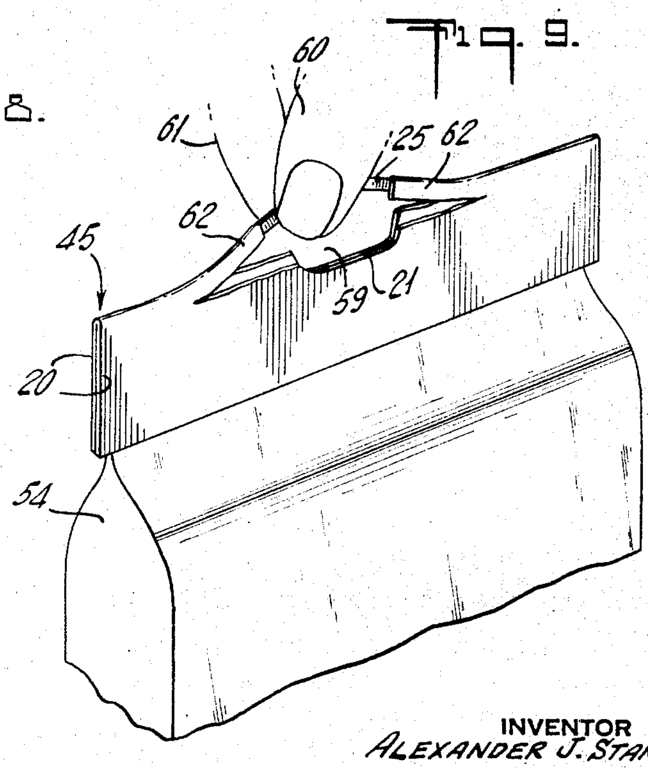
FIG. 9.
INVENTOR
ALEXANDER J. STANLEY
BY [signature]
AGENT United States Patent Office 3,728,199
Patented Apr. 17, 1973

1

3,728,199
TAPE APPLYING APPARATUS

Alexander J. Stanley, New Brunswick, N.J., assignor to Nabisco, Inc.

Filed May 17, 1971, Ser. No. 144,026
Int. Cl. B31f 5/00
U.S. Cl. 156—554 6 Claims

ABSTRACT OF THE DISCLOSURE

A relatively wide closure strip, preferably of metallic foil, is moved continuously in tension over the surface of a convex platen. The strip has a longitudinally aligned series of finger clearance apertures, and carries on its outer face a coating of thermoplastic adhesive of substantially lower melting point than that of the bag material to which the closure is to be applied. A narrow tearing tape is continuously fed over the platen in contact with the coated face of the strip and closely adjacent the common center line of the apertures, so that the tape spans the holes longitudinally. The inner zone of the platen immediately underlying the tape is maintained at a heating temperature sufficient to melt the plastic adhesive, thereby heat sealing the tape to the closure strip. An air jet cools the sealed joint, completing conversion of the strip and tape to a permanently composite web. The strip is hinge creased or serrated along the center line of the apertures to facilitate accurate subsequent folding, and the composite web is delivered either to storage reels or directly to packaging apparatus, as desired.

The present invention pertains to improvements in tape applying apparatus, being particularly directed to the rapid production of foldable closures for container bags and the like. The general nature of such closures is that set forth in U.S. Pat. No. 3,047,206 to Monahan et al., which patent has common ownership by assignment with the present application. Briefly recapitulated, the above patent includes a folded closure strip straddling the side walls of a container mouth and heat sealed to the said walls; the closure has a rip cord or thread in its upper folding angle to facilitate easy initial opening of the package, a central notch being provided to permit the opener's fingers to grasp the cord. While closures embodying this general structure have proved satisfactory in use per se, a limiting factor in their production to the best advantage has been the means by which the rip means has been applied to the closure strip with sufficient permanency to ensure against premature loosening and consequent malfunction; for example, the most satisfactory present method of attachment, namely by stitching, has necessarily entailed relatively slow production and high cost.

In view of the above, an object of the present invention is to provide improved apparatus for continuously securing rip means to a closure strip permanently and at high operative speed.

A further object is to provide apparatus of the above nature adapted to apply the rip means to an apertured strip in longitudinally spanning relation to successive apertures in the strip.

A further object is to provide apparatus of the above type in which the securing means includes means to heat seal the rip means to the closure strip.

A further object is to provide apparatus of the above nature adapted to combine rip means comprising a narrow tear tape with a closure strip of metallic foil to form a composite web.

Another object is to provide apparatus of the above type wherein the heat sealing means constitutes a convexly curved platen over which the strip and tape are

2 drawn in mutual contact, the portion of the platen underlying the zone of contact of the strip and tape being maintained at suitable heat sealing temperature.

Another object is to provide adjustable guiding means to predetermine the lateral relation of the applied rip or tear tape to the longitudinal center line of the apertures in the closure strip.

A further object is to provide for rapid cooling of the heat sealed joint after the composite web has emerged from the platen.

A still further purpose is to provide means to impress a longitudinal hinge or break line on the strip for convenience and accuracy during folding in subsequent closure operations.

Other objects and advantages will become evident during the course of the following description in connection with the accompanying drawings, in which:

FIG. 6 is a plan view of the composite web;

FIG. 7 is a perspective view illustrating the application of the closure combination to a container;

FIG. 8 is a cross sectional illustration of the same in the region 8—8, FIG. 7, hatching being omitted for clarity, and FIG. 9 illustrates a typical opening operation by means of the tear or rip tape.

Figures 1, 4, 5:
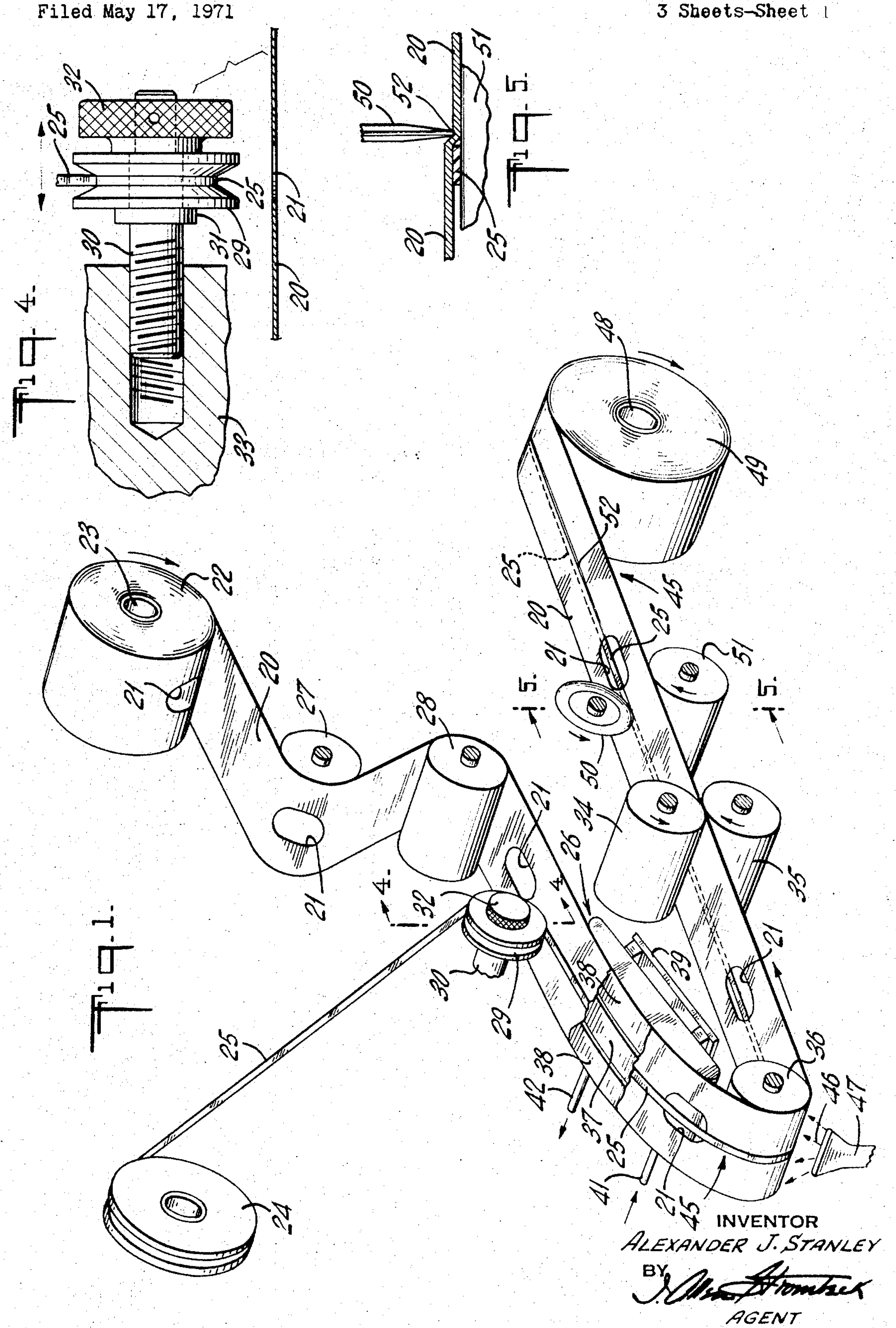
FIG. 1 is a semi-diagrammatic perspective view of a preferred embodiment of the invention.
FIG. 4 is a cross section of the adjustable tape guide in the plane 4—4, FIG. 1.
FIG. 5 is an enlarged illustration of the longitudinal creasing means.
Figures 2, 3:
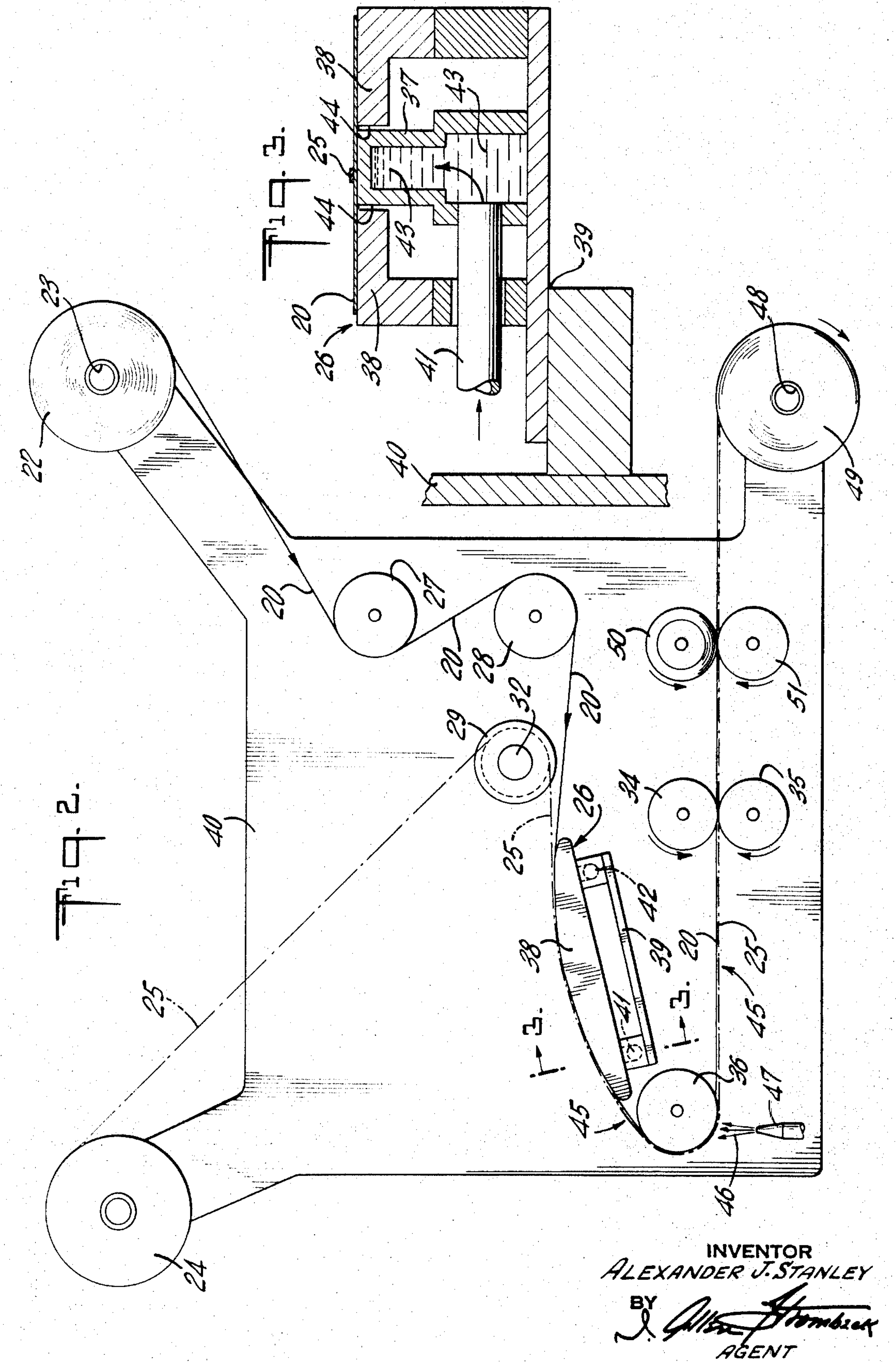
FIG. 2 is a side elevation of the same.
FIG. 3 is a simplified cross sectional view of the sealing platen in the zone 3—3, FIG. 2.

Referring to FIGS. 1 and 2, the numeral 20 designates an elongated strip, preferably of aluminum foil or the like, adapted to be cut into closure units of the general type disclosed in the previously mentioned Pat. No. 3,047,206, and usually including printed labelling data on one of its faces. The strip 20 is provided with longitudinally aligned and spaced apertures 21, and carries on its unprinted face a normally dry coating of thermoplastic adhesive having a lower melting point than that of the container walls to which the closure units are subsequently to be applied; the supply source of the strip is illustrated as a coil or roll 22 carried on a reel 23. Similarly, a narrow grooved spool or reel 24 carries a supply of slender rip or tear tape 25. The reels 23 and 24 are provided with frictional restraining means (not shown, being per se well known) to prevent slackening of the respective strip and tape fed therefrom.

Numeral 26 indicates a convex or arcuate metallic platen, hereinafter set forth in detail. From the reel 23 the strip 20 is directed via guide rollers 27 and 28 to and over the convex face of the platen 26, the adhesive-coated face of the strip being exposed upwardly. The tape 25 is also directed to the platen 26 so as to be moved over the latter in contact with the coated face of the strip 20.

The lateral position of the tape 25 with respect to the strip 20 is predetermined and maintained by a grooved guide pulley 29, the latter being adjustable by means typically illustrated in FIG. 4. Referring to the latter figure, it will be seen that the pulley 29 is rotatively mounted on a spindle 30 between a flange 31 and a knurled knob 32 secured to the spindle. The spindle 30 is threaded into a stationary support 33, so that by turning the knob the lateral position of the pulley 29 and hence that of the guided tape 25 may be adjusted as mentioned above.

Returning to FIGS. 1 and 2, numerals 34 and 35 indicate a pair of traction rolls of rubber or the like, power driven by any suitable means so as to provide the movement of the strip 20 and tape 25 together over the platen 26 via an intermediate end roller 36. The platen 26 is preferably constructed as shown in simplified cross section in FIG. 3. As shown, the platen comprises a middle section 37 and flanking side sections 38, all mounted on a bracket 39 secured to a frame plate 40; this frame may also provide common mounting for the various other elements of the apparatus to form a compact and convenient assembly as indicated in FIG. 2. The upper portion of the middle platen section 37, FIG. 3, is of hollow construction, and is adapted to be supplied via inlet and outlet conduits 41 and 42 (FIGS. 1, 2, and 3) with a circulating fluid 43 of hot oil or the like. The fluid 43, which may be heated, pumped and temperature-controlled by any suitable well known means, is so regulated as to maintain the convex face of the section 37 at a temperature just sufficient to cause melting of the adhesive coating on the strip 20, as previously mentioned. It will be noted in FIG. 3 that the flanking sections 38 of the platen 26 are separated from the middle section 37 by narrow gaps 44 which provide effective air insulation between the middle and side sections, thus preventing any heating of the latter to a temperature sufficient to plasticize the adhesive coating on the zones of the strip 20 overlying them. By this construction the region of heat sealing is confined to the middle zone of the strip 20 to which the tape 25 is to be attached, this zone being only wide enough to accommodate any desired position of the tape as determined by the adjustable setting of the grooved pulley 29, FIG. 4. The tape 25 is of any suitable material, preferably strong plastic, but in any case having a fusion point well above that of the adhesive coating on the strip 20. Thus the passage of the intimately engaged strip 20 and tape 25 over the platen 26 heat seals the two elements together without impairing the inherent strength of either, forming what may properly be termed a permanently composite web 45.

After leaving the platen 26 the composite web is subjected to a jet or blast of cooling air 46 delivered by a nozzle 47 adjacent the end roller 36, FIGS. 1 and 2, the effect being to ensure prompt setting and drying of the plastic adhesive, thus allowing high speed operation and compact machine assembly without danger of possible sticking or accumulation of adhesive on the traction rolls 34 and 35.

From the traction rolls the composite web 45 is delivered to receiving means, illustrated herein as a take-up reel 48 frictionally driven in the usual manner to maintain tautness in the incoming web, and adapted to accumulate a storage or transfer roll 49 of the web, FIGS. 1 and 2. Obviously, if desired, the receiving means may instead comprise the loading and packaging apparatus in which cut unit lengths of the web 45 are to be employed to seal loaded containers. However, as the present invention is adapted to produce its output of sealing web at a much higher rate than that at which the latter can be utilized by a single packaging unit, the storage roll receiving arrangement illustrated permits a single device of the present invention to serve a greater number or battery of packaging machines, with manifest advantages in equipment cost and flexibility in plant arrangement.

Situated between the traction rolls 34–35 and the above-described final receiving means is a narrow indenting or serrating wheel 50 which forcibly presses the strip 20 against the periphery of an underlying or backing roll 51, the latter being of hardened and accurately ground construction and positively driven by suitable power means (not shown) at a peripheral speed corresponding to the linear speed of the composite web 45. By this arrangement the wheel 50 indents or serrates a narrow longitudinal crease or hinge break line 52 in the strip 20 as shown in FIG. 5, in which latter figure the material thicknesses are necessarily exaggerated for clarity in illustration. The positive driving of the backing roll 51 relieves the web 45 and the take-up of the receiving means of any additional stress otherwise necessary to operate the creasing, serrating or indenting mechanism. It will be noted in FIG. 5 that the hinge line or crease 52 is located closely adjacent the inner edge of the attached tape 25, i.e., in substantial correspondence with the common center line 53 of the apertures 21, this center line itself being indicated in FIG. 6. The exact degree of closeness of the tape to the center line, and hence eventually to the hinge crease 52, is determined by the lateral adjustment of the guide pulley 29, as previously described in connection with FIG. 4.

The composite web 45 produced by the apparatus is suitable for use with various sizes and forms of containers, but is principally directed, though not confined, to the general types disclosed in the previously noted commonly owned Pat. No. 3,047,206. However, while such uses are set forth at length in the aforesaid patent, a brief recapitulation of a typical example embodying the closure means produced by the present invention is believed appropriate as permitting quick illustration without necessity for undue cross reference. Accordingly, such an example is shown in FIGS. 7, 8, and 9.

Referring first to FIGS. 7 and 8, the numeral 54 indicates a plastic bag of the type used for packaging food products such as cookie sandwiches 55 and the like. In effecting closure, the composite web 45 is folded down about the previously open upper loading border portion 56 of the bag 54 with the coated face of the strip 20 and the attached tape 25 on the inside of the fold, the hinge crease or break 52 facilitating accurate location and straightness of the top bend, FIG. 8. The sides of the strip 20 are then heat sealed to the outsides of the bag's border portion 56, the sealing temperature employed again being above the melting point of the thermoplastic coating on the strip 20 but substantially below that of the bag material, so that the internally abutting sides of the latter are not sealed together. The area of heat sealing is confined to a zone 57 (FIG. 8), which terminates substantially below the upper edges 58 of the bag's border portion 56, thus also avoiding heat sealing between the upper inward faces of the folded web 45 itself. It will have been borne in mind that the material thicknesses shown are greatly exaggerated in order to make proper illustration feasible; in actuality the materials are usually very thin and the upper bend at the crease line 51 is very sharp.

The above closing procedure results in the typical loaded container combination shown in FIG. 7, the folding of the composite web 45 having converted the aperture 21 to a finger notch 59 spanned by the tape 25. As previously mentioned, the outer faces of the folded strip 20 normally carry any desired printed matter (not shown) such as trademarks, instructions or the like. When the package is to be opened, the tape 25 spanning the notch 59 may be grasped by the consumer's thumb 60 and finger 61, FIG. 9, and pulled upward as shown, thus ripping the strip 20 to effect the opening. During this operation the fact that the joining of the tape 25 to the strip 20 as provided by the apparatus of the present invention constitutes a firm and permanent heat sealed joint throughout, prevents any such displacement or loosening of the ripping means as has been an occurrance in various types of prior rip cord openers. In fact, not only does the heat sealed joint prevent loosening of the tape 25, but it also causes the latter to carry with it the narrow portion 62 of strip 20 directly sealed thereto; this portion 62, (slightly exaggerated in width in FIG. 9 for clarity) actually reinforces the tape 25 against any possible tendency toward breakage at the outwardly progressing tear in case the opening is performed suddenly or jerkily. This detail is illustrative of the fact that the apparatus of the present invention, in addition to its own characteristics of simplicity, high operative speed, economy and convenience of installation, is adapted to produce a final closure means superior per se to any such means disclosed or suggested in the prior art.

With respect to the prior art, and in addition to the previously noted commonly owned U.S. Pat. No. 3,047,-206 to Monahan et al., the following U.S. patents may be listed as of interest:

| | | |
|---|---|---|
| 3,472,129 | 10/4/69 | Alexandrou |
| 3,554,435 | 1/12/71 | Martinez |
| 3,554,436 | 1/12/71 | Palmer |

None of these three patents bears to any significant degree on the present invention, but they may be regarded as pertinent to the extent that while falling within the general category of cord and container combinations, they by their very remoteness from the present concept serve further to accentuate the latter's manifest improvements in the field.

Of the listed three patents the most technically pertinent is that to Alexandrou, in so far as it deals with tape applying apparatus, it being in fact the only one of the three which shows any applying means whatever. The apparatus disclosed, however, is so far removed in concept and structure from the present invention that its lack of applicability thereto becomes self-evident with the briefest examination. Alexandrou's device is a highly complicated machine devoted solely and explicitly to the insertion of cold adhesive tear and reinforcing tape strips in the closure flaps of envelopes. His disclosure contains no reference to heat sealing, much less to any manner in which the latter could be incorporated to serve any useful purpose. The operation is necessarily intermittent, which fact alone would disqualify the machine for any such high speed continuous productive ability as that which is a feature of the present invention; add the further facts that the Alexandrou machine embodies a variety of movable vacuum cups, "plugs" (successive positioning stops), "pincers," rocking roller systems, etc., all necessary to its purpose as disclosed but altogether foreign to the present invention, and the lack of any significant bearing by Alexandrou becomes readily manifest as noted above.

The patent to Martinez is listed as of interest because it illustrates a cord incorporated in one end of a bag by heat sealing. However the cord is not in any sense a rip cord for opening purposes but is precisely the opposite; i.e., the cord serves simply as a reinforcement to prevent accidental rupture of the bag. This patent shows no fabricating apparatus and obviously has no significant bearing on the present invention, serving merely to illustrate a phase of the general art.

Similarly, the Palmer patent serves to illustrate another phase of the art, namely the use of a metallic foil strip at the upper portion of a container; such provision per se of course is well known in the prior art, in fact being incorporated in the description and claims of the patent to Monahan et al., previously noted as having common ownership with the present application by assignment. Palmer's strip has no attached rip cord or tape, but simply defines a line along which opening can be effected only by tearing away the top of the bag itself. These points, together with the fact that Palmer shows no attaching apparatus of any description, again make obvious the lack of any significant bearing on the present invention.

From the above indication of the general state of the art and in view of the preceding description of the apparatus and operation of the present invention, it is believed evident that the latter constitutes a new and highly useful combination adapted to provide an improved product with maximum speed, efficiency and economy. As previously noted, the descriptive matter and drawings have been taken as applied to a typical preferred form of the apparatus dealing with a particular product material. Thus the material of the sealing and labelling strip 20 has been designated typically as metal foil such as aluminum, a material which has marked advantages such as its "dead folding" quality or lack of tendency to spring open at bends, a quality which retains a sharp fold at the top of the closed container and similarly permits tight reclosure of a previously opened bag by sharp folding downward in the zone to which the remaining foil is attached; another advantage of the metal is its high thermal conductivity, which allows the heat healing operations to proceed at maximum speed and with minimum temperature differential. However, if in some application it may be required or desirable to make the strip 20 of materials other than foil, such as plastic or paper, the device is operable in the same manner as set forth, but is altered or adjusted in detail to meet the partcular physical characteristics of the material in hand. For example, if an application occurs calling for a strip 20 of paper rather than foil, the lower thermal conductivity of the paper may be dealt with in a number of ways. First, if the particular requirement does not call for maximum speed of output, the speed of the entire device may be reduced to allow more seal melting and cooling time; secondly, if the overall operative maximum speed must be maintained, the temperature of the platen section 37 may be raised and the subsequent cooling air blast may be increased; or the body of the platen 26 may be increased in overall dimension or effective arcuate extent, together with the increased air blast; obviously any desired combination of the above and related adaptability may be employed. Thus while the invention has been set forth in typical preferred form, it is not limited to the precise embodiment illustrated, as various modifications may be made without departing from the inventive concept within the scope of the appended claims.

What is claimed is:

1. In an apparatus for applying a tear tape to an elongate closure strip for immediately sealing the open mouth of a plastic food containing bag, said elongate closure strip having a coating on one face with a normally dry thermoplastic coating, in combination, a source of supply of said closure strip, a source of supply of said tape, a convex platen, means to move said strip and said tape from said respective sources to and over said platen with the uncoated face of said strip contacting said platen and with said tape engaging said coated face of said strip, means to predetermine the lateral positioning of said engaging tape with respect to the width of said strip, and means to supply heat to said platen and through the same to said contacting strip sufficiently to effect fusion of said thermoplastic adhesive underlying said engaging tape but insufficient to cause sealing of the interior mouth edges of said plastic bag.

2. Apparatus according to claim 1 adapted to operation on a form of said strip having a series of longitudinally aligned and spaced apertures, and wherein said lateral positioning means includes guiding means operationally disposed between said tape supply source and said platen and adapted to direct said tape into longitudinally spanning relation with said apertures in said strip.

3. Apparatus according to claim 2 wherein said guiding means is adapted normally to maintain said lateral location of said engaging tape on one side of and adjacent the common longitudinal center line of said series of apertures in said strip, and wherein said guiding means is laterally adjustable to predetermine the closeness of said adjacency.

4. Apparatus according to claim 1 wherein said heating of said platen and said strip is confined to a fractional portion of the widths of these elements, said portion encompassing the zone of applicability of said tape to said strip.

5. Apparatus according to claim 4 wherein said platen comprises a hollow middle section and two outer flanking sections thermally insulated from said middle sections, the parallel convex faces of said three sections jointly forming the contact support for said strip moving thereover, and conduit means adapted to direct a circulation of heating fluid through said hollow middle section.

6. Apparatus according to claim 1 including means to establish a longitudinal hinge break line in said strip element of said composite strip closely adjacent said tape element sealed thereto.

References Cited

UNITED STATES PATENTS

| | | | |
|---|---|---|---|
| 2,829,701 | 4/1958 | Keely | 156—554 X |
| 2,307,406 | 1/1943 | Howard | 156—554 |
| 3,617,415 | 11/1971 | Hawerkamp | 156—171 |

DAVID KLEIN, Primary Examiner

J. L. GOODROW, Assistant Examiner

U.S. Cl. X.R.

229—66